3,113,554
METHOD FOR CULTURING PEARLS
Masakuni Kanai, 1051 Wadahoncho, Suginami-ku,
Tokyo, Japan
No Drawing. Filed Mar. 12, 1962, Ser. No. 179,231
6 Claims. (Cl. 119—4)

This invention relates to an improved method of culturing pearls.

The present customarily used method for culturing pearls is a piece method, wherein cut pieces of mantle films (that is, cell pieces) of mother of pearls are inserted into a shell muscle of mother-of-pearl together with nuclei. In this method it must be considered that death of cells frequently occurs prior to the calcification of organic substances. This inhibits the spiral growth of pearls. The reason for this is believed to be as follows:

In general, it is within common knowledge that plastic surgery often causes liver troubles due to blood transfusion or absorption of grafted bone. In the grafting of texture to a living body or by adding blood and body liquid of the same or other living bodies to the living body, the occurrence of antigen reaction of antibodies must be anticipated. As the grafting of cut pieces itself is an operation disturbing the body functions, the prior art culturing method does not result in satisfactory pearls. In addition, the virulence of excrements and the collapse due to the antigen reaction of antibodies must, of course, be considered as a reason for the yearly intensified ill growth of pearl shells on account of repeated culture on the same field of culture. Certain organic substances to be added tend, of course, to remove the individualities of each living body from protein through treatments such as heat treatment, disinfection and the like. Only then the organic substances become an effective component, just as it is in the case of human bodies.

Considering the above explanation, a method for the culture of pearls is provided according to the present invention, which is characterized in that substances are positioned in the shell which serve as calcification bases (called simply "base" hereafter). This base may consist of a macromolecular substance such as gelatine and arginic acid in spongy form. A calcium salt such as calcium carbonate and/or other medicine or inorganic substance which is effective for the calcification is then incorporated into the base material. The nucleus is then coated with a layer of this material and is put adjacent the internal organ of a shell or inserted into a muscle of mother of pearl. The nucleus is used as a calcification base and simultaneously as an accelerator for the growth of pearls.

According to the process of this invention, inorganic substances such as calcium carbonate, etc. are serviceable as a calcification base, because the dissolution of bases in liquid, such as sea water is extremely retarded due to electric dissociation in said liquid and also the base, in the presence of calcium carbonate, may accelerate the growth of the lime content (i. e. pearl material). Ordinarily, the dissolution of bases in liquid is performed in about two days, while in the method according to present invention, said bases may remain for more than one week to one month. When an inorganic substances is present in the form of ions, the substance absorbs water of crystallization of organic substances and facilitates the deposition of organic substances, for the reason that the volume of ions is varied for the same electrical charge. Accordingly, the Coulomb's gravitation, due to the depolarization of water molecules, is varied remarkably. Moreover, the size of minute crystal grains of calcium carbonate, which is always contained in the base depending on the composition of the medicine used, may be changed, thereby varying the color tone of the luster of pearls. Differing from the conventional methods in which textures or blood of the same or different kind of living bodies are used, the method of this invention does not suffer from bad effects due to the antigen antibody action, and various medicines may be added if necessary, in addition to the substances such as calcium carbonate which are effective for calcification. For this reason, the method of this invention possesses the particular advantage of being capable of diversified applications.

In the following, some experimental examples are given:

Culture of pearls was performed at Enoura of Numazu City, Japan, during about 6 months from June 20, 1960, to December 20, 1960. The diameters of pearls deposited on nuclei of 4 mm. dia. were as follows:

TABLE 1

| Frequency | 1 | 3 | 3 | 6 | 9 | 6 | 5 | 7 | 7 | 2 | 1 | 1 | 0 |
|---|---|---|---|---|---|---|---|---|---|---|---|---|---|
| Diameter (mm.) | 4.0 | 4.1 | 4.2 | 4.3 | 4.4 | 4.5 | 4.6 | 4.7 | 4.8 | 4.9 | 5.0 | 5.1 | 5.2 |

Of a total of 50 pieces, the average diameter was 4.66 mm.

Of course, an accurate judgement can not be made, because no comparative experimental data based on the culture was performed in the same period at the identical location. Nevertheless, the following conclusion may be drawn from comparison with the known data published in Table 2 where the spiral growth of pearls is shown with respect to the culture performed at an unknown location and during an unknown period.

TABLE 2

| Dia. of nucleus, mm. | Dia. of pearl, mm. | Thickness increased, mm. | Years |
|---|---|---|---|
| 3.95 | 4.7 | 0.363 | 2.5 |

Authors: Kobayashi; Watanabe: "Shinju No Kenkyu" (Study of Pearls), 1959. Publisher: Gihodo; page 195; Table 110.

The increase of 0.66 mm. dia. at the present experiment (Table 1) means an increase of 0.33 mm. in the thickness of the pearl layer, which is approximately equivalent to the increase for 2.5 years of above-cited Table 2.

The examples of the embodiment of the present invention are as follows:

*Example 1*

10 mg. gelatine are aerated to such extent that the gelatine assumes a soft spongy form. 50 mg. of calcium carbonate and 1 mg. of condroitine sulfate and 10 mg. of calcium fluoride are then incorporated in said spongy substance. Nuclei made of thin pieces of Mississippi river ditch shell (approximately 4 mm. diameter) were then coated with the spongy substance. The subsequent culture work may be performed by prior art methods.

*Example 2*

1 g. of arginic acid was admixed with 1 g. of gypsum. The resulting mixture was admixed with 50 mg. of calcium carbonate, 1 mg. of condroitine sulfate and 10 mg. of calcium fluoride. Nuclei were coated with this substance, as in Example 1.

What I claim is:
1. In a method of culturing pearls, wherein a nucleus is inserted into a shell, the improvement which comprises coating said nucleus with a layer of a macromolecular spongy substance, said layer having incorporated therein an inorganic calcium salt.

2. The improvement of claim 1, wherein said macromolecular substance is selected from the group consisting of gelatine and arginic acid.

3. The improvement of claim 1, wherein said inorganic calcium salt is selected from the group consisting of calcium carbonate, calcium sulfate and calcium fluoride.

4. The improvement of claim 1, wherein said layer has incorporated therein condroitine sulfate.

5. A method of culturing pearls, which comprises inserting into an oyster shell a piece of mother-of-pearl coated with a layer of calcification-promoting material, said layer being of spongy consistency and comprising (a) a substance selected from the group consisting of gelatine and arginic acid, and
(b) a calcium salt selected from the group consisting of calcium carbonate, calcium sulfate and calcium fluoride.

6. The method as in calim 4, wherein the layer has incorporated therein condroitine sulfate.

References Cited in the file of this patent

UNITED STATES PATENTS

| | | |
|---|---|---|
| 988,889 | Mikimoto | Apr. 4, 1911 |
| 2,126,024 | Mikimoto | Aug. 9, 1938 |